(12) United States Patent
Sodergard et al.

(10) Patent No.: US 6,559,244 B1
(45) Date of Patent: *May 6, 2003

(54) PROCESSABLE POLY(HYDROXY ACIDS)

(75) Inventors: Anders Sodergard, Turku (FI);
Johan-Fredrik Selin, Helsinki (FI);
Maria Niemi, Helsinki (FI);
Carl-Johan Johansson, Porvoo (FI);
Kersin Meinander, Porvoo (FI)

(73) Assignee: Neste Oy, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/507,326

(22) PCT Filed: Dec. 29, 1994

(86) PCT No.: PCT/FI94/00586

§ 371 (c)(1),
(2), (4) Date: Oct. 16, 1995

(87) PCT Pub. No.: WO95/18169

PCT Pub. Date: Jul. 6, 1995

(30) Foreign Application Priority Data

Dec. 31, 1993 (FI) .................................. 935964
Nov. 9, 1994 (FI) .................................. 945264

(51) Int. Cl.⁷ ............................................. C08F 283/04
(52) U.S. Cl. ...................... 525/420; 525/437; 525/450; 524/14; 524/47; 524/272; 524/425; 524/524; 524/442; 524/450; 524/599
(58) Field of Search ................................. 525/420, 437, 525/450; 524/14, 47, 272, 270, 425, 442, 447, 450, 449, 539, 538, 599, 606; 523/123

(56) References Cited

U.S. PATENT DOCUMENTS

| | | | |
|---|---|---|---|
| 2,703,316 A | | 3/1955 | Schneider |
| 3,523,920 A | | 8/1970 | Schultz |
| 4,045,418 A | * | 8/1977 | Sinclair ...................... 528/357 |
| 4,057,537 A | * | 11/1977 | Sinclair ...................... 528/354 |
| 5,502,158 A | * | 3/1996 | Sinclair et al. ............. 528/354 |
| 5,594,095 A | * | 1/1997 | Gruber et al. .............. 528/354 |
| 5,798,435 A | * | 8/1998 | Gruber et al. .............. 528/354 |

FOREIGN PATENT DOCUMENTS

| | | |
|---|---|---|
| DE | 4102170 | 1/1991 |
| DE | 4300420 | 7/1994 |
| WO | WO9407949 | 4/1994 |

OTHER PUBLICATIONS

A. Södergård et al "Polymer Degradation and Stability" 46 (1994) pp. 25–30.

An English language abstract of Publication No. J68002949–B.

An English language abstract of Publication No. J68008614–B.

* cited by examiner

*Primary Examiner*—Edward J. Cain
(74) *Attorney, Agent, or Firm*—Birch, Stewart, Kolasch & Birch, LLP

(57) ABSTRACT

A processable poly(hydroxy acid) composition which has been stabilized by adding to the polymer during the melt processing stage 0.05–3% by weight of a peroxy compound the degradation of which produces one or more acid radicals, and which has good melt strength and elasticity. The melt strength is high enough to produce films with conventional methods as the film blowing method.

13 Claims, 1 Drawing Sheet

PROCESSABLE POLY(HYDROXY ACIDS)

Figure 1:
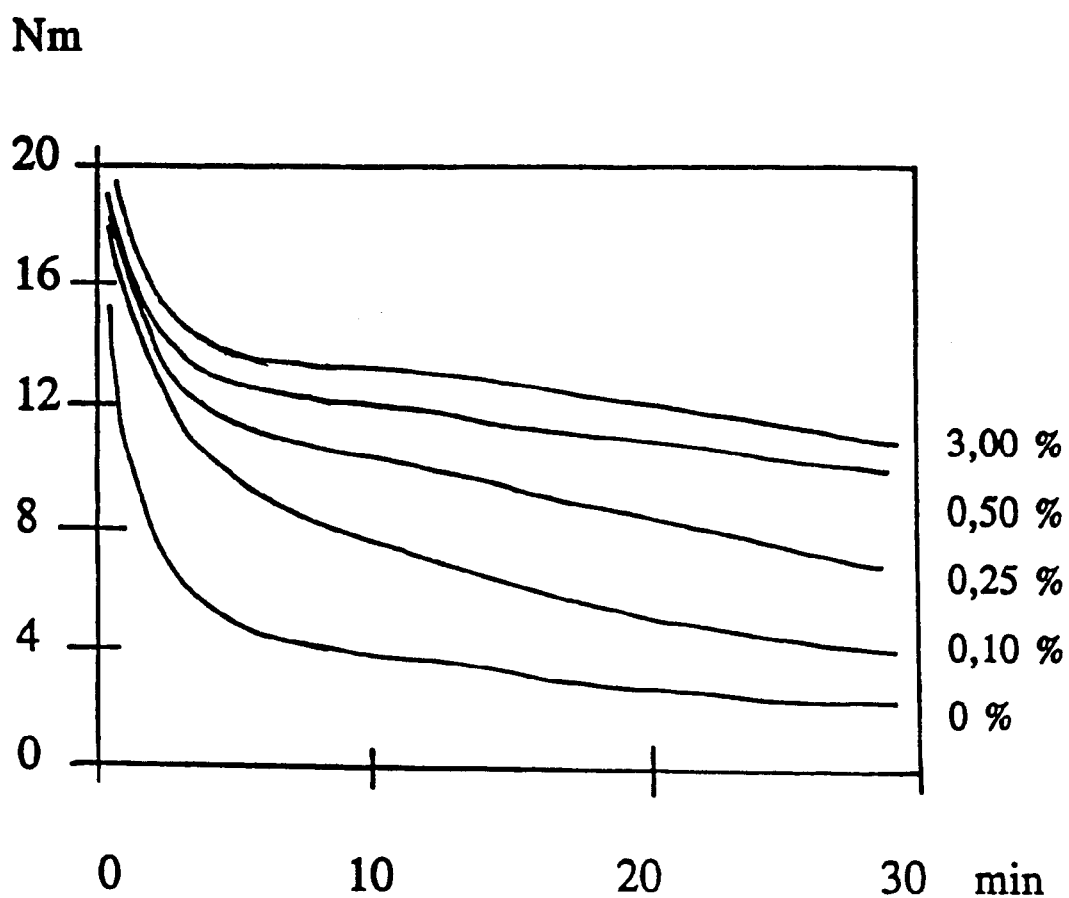

This invention relates to poly(hydroxy acid) compositions which have high melt strength and are processable. Especially the invention relates to the use of those compositions in making films.

Biodegradable polymers, biopolymers, constitute a group of materials subject to continual development. Among them are poly(hydroxy acids) which are polymers in which monomers contain both a carboxyl group and a hydroxyl group. Examples of such polymers include polylactic acid (polylactide, PLA), poly(hydroxybutyrate), polyglycolide, and poly($\epsilon$-caprolactone). Polylactide or polylactic acid, which is most often prepared from lactic acid dimer, lactide, has already for years been used for medical applications like sutures, degradable bone nails or for controlled release of drugs. The molar mass of the polymer in those applications is typically very high and the polymer is purified by dissolving and precipitating it before processing, the thermal degradation is then less. The high price of the polymer and its thermal degradation during processing has limited its use in bulk applications like packaging. It has not been economically profitable to produce and handle the polymer by methods such as those used for medical applications.

Polylactic acid can be produced directly by polycondensation reactions, which are typical in manufacturing of polyesters. However, the highest molar masses are achieved by ring opening polymerisation of lactide. Polylactide is a thermoplastic polyester, which has properties similar to many conventional polymers. However the problem has been that these polymers are difficult to process, and for instance the producing of blown films has not been possible.

The use of polylactides also for other than medical applications has been of special interest lately. A biodegradable, compostable material for hygiene products, agricultural films and packaging applications, either for paper coatings or free films, has been seeked. The reason has been both an aim towards using natural materials instead of fossil raw materials and the good mechanical and barrier properties of polylactides compared to e.g. starch based thermoplastic materials.

Polylactide is a thermoplastic polyester which resembles many conventional polymers.

There is, however, the problem that polymers break down during processing and the molar mass drops considerably. As a result, the useful life of the end products and, partly, their mechanical properties deteriorate. With conventional polymers these problems can be eliminated by using stabilizers. The aim in the use of stabilizers is to maintain the molar mass as constant as possible after polymerization, and in particular also during processing. The change in the molar mass can be monitored by means of, for example, melt viscosity.

Conventional stabilizers, which can be used with aromatic polyesters, are not effective on lactic acid polymers. Boric acid, which, according to German patent application DE 4102170, is used for the stabilization of poly (hydroxybutyrate), does not function with lactic acid polymers.

Certain experiments on various stabilizers have been published. In Japanese patent publication JP68008614, polylactic acids have been stabilized with lactone compounds, such as $\gamma$-butyrolactone or $\alpha$-acetal-$\gamma$-butyrolactone. Japanese patent publication JP68002949 describes the adding of isocyanate to improve the heat resistance of lactic acid polymer. These methods have been experimented with, but the results have remained poor.

Attempts have also been made to produce films from pure polylactides, but with no success. Some films have been made by blending with other polymers or from copolymers.

In the German patent application DE 43 00 420 there has been given a blend of polylactide and another aliphatic polyester, preferably polycaprolactone. The polymers are mixed in the melt, granulated and the granules are treated for extended times at temperatures just below melting in order to achieve a transesterification.

The PCT-application WO 92/04493 disclose polylactide compositions with high amount of lactide or lactide oligomers as plasticizing agents in order to achieve flexibility.

In the PCT-application WO 94/07941 melt stable polylactide compositions have been given which are said to be suitable for films. The residual lactide and moisture content have to be very low, and a certain amount of mesolactide must be used in the polymerization. Some "films" are prepared in the example 2 by extrusion of thick sheets. The thicknesses of the tested products is 1–13 mm. Test bars are used in all other examples. Also according to this patent application it is most preferable to use polylactide blends with e.g. polycaprolactone.

Polylactides or copolymers have been made into self-supporting films by casting from solutions or by pressing, as are given already in very old patent publications. As examples are U.S. Pat. Nos. 2,703,316 and 4,045,418.

It is obvious that although many attempts to make films have been made, large scale production based on economical conventional large-scale blown film methods to make thin oriented films has not been possible due to low or missing melt strength of the polymer. If films have been obtained with some method they have been brittle and have had very low elongation at break values unless heavily loaded with palsticizers or blended with other polymeric components.

An other important issue is melt stability. It is well known that polylactides degrade at elevated temperatures during melt processing. Although most mechanical properties would be retained above a certain threshold molar mass, the viscocity decreases drastically and also this makes film blowing of these polymers impossible. Only in the already above mentioned PCT application WO 94/07941 melt stable compositions have been discussed, but even here the melt melt strength is not sufficient for film blowing. The melt stability in that publication is a sum of many different factors and a certain strictly defined polymer composition is needed.

According to the present invention, it has now been observed, surprisingly, that polylactic acids can be stabilized by adding various peroxides to the mixture during processing or as a separate step. By peroxide addition, the scission of chains can be reduced, i.e. the decrease in molar mass can be slowed down. The stabilizing effect of peroxides can also be observed from the melt viscosity value, which, owing to the peroxide addition, decreases during processing considerably more slowly than without peroxide. The effect of peroxides can be manyfold. The catalyst deactivation and end group capping seem to be possible mechanisms. Crosslinking can be neglected, because no gel formation can be observed. The theoretical background of the action of peroxides is outside the scope of this invention.

Further, the object of this invention is to achieve a polylactide composition, which has good melt strength and elongation. Further an object has been to achieve a composition which possesses a melt strength high enough for making films by conventional processing methods, especially by film blowing methods.

In stabilization according to the invention it is possible to use a number of commercially available organic peroxy compounds. Especially suitable are peroxy compounds from which acids are formed as degradation products. It is evident that this acid radical stabilizes the hydroxyl end group of the polymer. Furthermore, it has been observed that peroxides acting as stabilizers are characterized by a short half-life, preferably below 10 s, but most preferably below 5 s. Examples which can be given of suitable peroxides include dilauroyl peroxide (half-life at 200° C. 0.057 s), tert-butylperoxy-diethylacetate (0.452 s), t-butylperoxy-2ethylhexanoate (0.278 s), tert-butylperoxyisobutyrate (0.463 s) and tert-butylperoxyacetate (3.9 s), tert-butylperoxybenzoate (4.47 s) and dibenzoylperoxide (0.742 s). The last-mentioned two have proved to function especially well. It is natural that only a few examples of functioning peroxides were mentioned above, and that other peroxides functioning in a corresponding manner are also within the scope of the invention.

The amount of peroxide used is preferably 0.01–3% by weight. The most preferable amount depends on the peroxy compound.

Surprisingly it has also been found that by stabilising polylactides with certain peroxides the melt strength and elongation after stabilization are very high. The elongation is even 150–300%. This enables the film blowing of polylactides using conventional commercial film blowing equipment. The films can also be effectively oriented.

The polylactide used can be made from L-, D- or D,L-lactide or their blends with any polymerization method. Also copolymers or polymer blends can be used, but it is not necessary for the usability of the invention. Especially preferable it is to use poly-L-lactide. The polymer according to the invention has a weight average molecular weight ($M_w$) of about 20 000–400 000, preferably 40 000–200 000. This relates to a number average molecular weight ($M_n$) of 10 000–200 000, preferably 10 000–100 000.

Polylactide films can easily be tailored to different purposes by adding small amounts of conventional plasticizers, pigments, fillers etc.

Suitable plasticizers are generally available commercial plasticizers like di- or tricarboxylic acid esters, epoxide oils or esters, polymeric polyesters, aliphatic diesters, alkylether mono- or -diesters and glycerine esters. Also blends of these plasticizers can be used. If plasticizers are used, the suitable amounts are 0.5–30 weight-%.

As fillers all conventional inorganic or organic fillers can be used, like calcium carbonate, kaolin, mica, talc, silicium oxide, zeolite, glass fibers or spheres, starch or saw dust. Suitable amount of filler can be 0.5–50 weight-% depending on the end product.

Films can be made by film blowing methods from the polylactide composition according to this invention, which is one of the biggest benefits of this invention. In addition to that, of course, cast films or sheets can be made, which does not usually set as high demands on the material. The thickness of the blown or cast films can easily be tailored according to the end product by using polymers with different molar masses and by varying the amount of peroxides and also by adding suitable plasticizers and/or fillers.

The objects of usage of the films are all conventional applications of films and especially those where one wants to minimize the amounts of waste and to treat for instance by composting. Such applications are e.g. different packaging materials like pouches, films, bags and hygiene products like diapers and different agricultural films.

Sheets made from polylactide can be processed to different packaging trays or lids, or in agricultural use to shallow containers or pots.

Many different kinds of products can be made from the polymer composition according to this invention. One such application is so called twist-films, which means for example wrappings used for candies, which are wrapped around the product and twisted in both ends to close the package. The twist should remain closed and not open before the candy is used by the consumer. Not many polymers exist which have good twist properties. One of the best twist materials has been cellophane.

It is also typical for the films and sheets made from the polymer composition according to the invention that they are easily sealable either by heat sealing or high frequency sealing. Also different printing inks, also water soluble, stick to the film very well.

The invention is described in greater detail with the help of the following examples.

In the examples 1–3, two different poly(L-lactic acids) were used, having their weight-average molar masses $M_w$ were 160,000 and respectively 140,000 g/mol, and their number-average molar masses $M_n$ were approximately 70,000 and respectively 60,000 g/-mol. Thus the ratio of the molar masses $M_w/M_n$ was approximately 2.3. The polymers were prepared at Neste Oy and were used as such in the experiments. The following peroxides were used for stabilization in the experiments:

A. dibenzoyl peroxide (Fluka), half-life 0.742 s
B. di-tert-butyl peroxide (AKZO), half-life 20.5 s
C. dicumyl peroxide (AKZO), half-life 14.7 s
D. tert-butyl peroxybenzoate (AKZO), half-life 4.47 s All of the peroxides were commercial products and were used as such.

In other examples also polylactides produced by Neste Oy having molar masses ($M_w$) of 115 000, 130 000 and 145 000 were used.

The molar masses were determined with GPC (Gel Permeation Chromatography) equipment by using the polystyrene standard. DSC (Differential Scanning Calorimetry) measurements were performed with Perkin Elmer DSC 7 and Mettler DSC-30S equipment. The weight of the samples in these measurements was 10 mg. The heating and cooling rate was 10° C./min, and there were two cycles in the measurements. The thermogravimetric analyses (TGA) were performed by using a Mettler TG50 device. The sample size in the measurements was 10 mg, the sample was heated in a nitrogen atmosphere to 500° C., and the heating rate was 10° C./min. The gel content of the polymer was determined according to the method ASTM D 2765 by using chloroform as the solvent.

EXAMPLE 1

Films

The stabilization of polylactic acid was investigated by using a Brabender mixer (Plasticorder$^R$PL 2000), by means of which it was possible also directly to monitor the melt viscosity of the compound from the torque of the machine. 40 g of polylactide having $M_w$ 160.000 was mixed with 0–3% of dibenzoyl peroxide (A) for 5 min at 180° C. It was assumed that all the peroxide had reacted, and DSC measurements showed no extra peak. The polymer samples were compressed between PET films for 15 s, at a pressure of 200 bar and a temperature of 180° C. After molding, the films were cooled rapidly to room temperature. The thickness of the film was 250–300 μm. The film dissolved in chloroform, and no gel was optically detectable.

The amount of peroxide added affected the melt viscosity, as can be seen from FIG. 1. Melt viscosity increases when peroxide is added in an amount of 0–0.5% by weight, but the difference is small between an addition of 0.5% by weight and 3.0% by weight. If no peroxide is used, the melt viscosity decreases sharply during processing.

EXAMPLE 2

Tapes

Polylactide having $M_w$ 140.000 was mixed with peroxides A–D. The peroxides were dissolved in a small amount of cyclohexane before being added. However, when peroxide A was used, toluene was used as the solvent, since peroxide A does not dissolve in cyclohexane. The solvent was evaporated out from the polymer before processing. All of the experiments were carried out in a nitrogen flow. The size of the experimental batch was 40 g of polylactic acid. Thereafter the sample was processed into tapes in a Brabender Plasticorder$^R$PL E651 single-screw extruder. The zone temperatures were 190° C., 200° C., 200° C., and the nozzle temperature was 200° C. The rotation speed of the screw was 50 rpm. The retention time in the extruder was approximately 1.5 min.

The molar mass $M_w$ of the unstabilized reference sample of polylactide dropped during processing at least to one third of its original value. $M_w/M_n$ dropped from the initial value 2.3 to approximately 1.9. According to DSC analysis, the reference sample had a glass transition point $T_g$ of approximately 50° C., a melting point $T_m$ of approximately 170° C., and a crystallinity $C_r$ of approximately 50%. According to thermogravimetric analysis, its degradation temperature ($T_D$) was approximately 303° C. Table 1 shows the molecular weights when different peroxides were used, and Table 2 shows the DSC/TGA measurement results of the corresponding experiments. The results in Table 1 show that the desired stabilization effect is not achieved with peroxides B and C, but with peroxides A and D the molar mass decreases only slightly.

TABLE 1

GPC measurements: PLLA N35 + peroxide A–D.

| Peroxide | $\overline{M}_n$ (g/mol) | $\overline{M}_w$ (g/mol) | $\overline{M}_v$ (g/mol) | $\overline{M}_w/\overline{M}_n$ |
|---|---|---|---|---|
| reference | 24930 | 48490 | 45190 | 1.95 |
| A 0.1 wt-% | 44250 | 98800 | 90600 | 2.25 |
| A 0.5 wt-% | 52650 | 107000 | 98050 | 2.05 |
| A 0.7 wt-% | 56200 | 109500 | 100250 | 1.95 |
| A 1.0 wt-% | 56600 | 115000 | 105000 | 2.00 |
| B 0.1 wt-% | 17100 | 32850 | 30650 | 1.90 |
| B 0.5 wt-% | 14750 | 27550 | 25750 | 1.85 |
| C 0.1 wt-% | 16950 | 32400 | 30250 | 1.90 |
| C 0.5 wt-% | 15450 | 31750 | 29500 | 2.10 |
| D 0.1 wt-% | 38200 | 80300 | 73850 | 2.10 |
| D 0.2 wt-% | 48450 | 115500 | 105000 | 2.40 |
| D 0.5 wt-% | 43900 | 92650 | 84300 | 2.05 |
| D 0.7 wt-% | 55250 | 127000 | 114500 | 2.30 |
| D 1.0 wt-% | 41600 | 95950 | 85300 | 2.30 |
| D 3.0 wt-% | 30200 | 121000 | 97900 | 4.00 |

TABLE 2

DSC/TGA measurements: PLLA N35 + peroxide A–D.

| Peroxide | $T_g$ (° C.) I | $T_g$ (° C.) II | $T_m$ (° C.) I | $T_m$ (° C.) II | $\Delta H_m$ (J/g) I | $\Delta H_m$ (J/g) II | $C_r$ (%) $\Delta H_{100\%}$ = 93.6 J/g | $T_D$ (° C.) |
|---|---|---|---|---|---|---|---|---|
| reference | 42.6 | 49.6 | 168.1 | 169.8 | 41.5 | 46.9 | 50.1 | 303 |
| A 0.1 wt-% | 50.1 | 50.2 | 165.5 | 172.7 | 32.3 | 33.5 | 35.8 | 315 |
| A 0.5 wt-% | — | 47.9 | 160.4 | 171.8 | 33.9 | 36.2 | 38.7 | 313 |
| A 0.7 wt-% | — | 49.8 | 155.6 | 172.7 | 30.7 | 37.9 | 40.5 | 313 |
| A 1.0 wt-% | — | 41.0 | 162.4 | 168.4 | 34.7 | 39.4 | 42.1 | 313 |
| B 0.1 wt-% | 33.6 | 45.1 | 164.4 | 166.9 | 41.4 | 46.3 | 49.5 | 305 |
| B 0.5 wt-% | 33.6 | 46.3 | 163.2 | 166.7 | 41.8 | 45.6 | 48.7 | 303 |
| C 0.1 wt-% | 34.0 | 47.8 | 164.4 | 168.5 | 41.7 | 46.2 | 49.4 | 307 |
| C 0.5 wt-% | 34.3 | 46.5 | 163.1 | 166.6 | 41.0 | 43.8 | 46.8 | 309 |
| D 0.1 wt-% | 35.2 | 48.2 | 165.3 | 170.2 | 36.0 | 37.5 | 40.1 | 313 |
| D 0.2 wt-% | 39.5 | 49.5 | 165.3 | 171.8 | 33.2 | 33.9 | 36.2 | 313 |
| D 0.5 wt-% | 33.9 | 46.5 | 164.3 | 168.6 | 34.1 | 36.1 | 38.6 | 315 |
| D 0.7 wt-% | 30.6 | 44.5 | 164.4 | 170.3 | 34.3 | 40.7 | 43.5 | 317 |
| D 1.0 wt-% | 32.4 | 45.6 | 162.3 | 165.1 | 33.8 | 35.6 | 38.0 | 319 |
| D 3.0 wt-% | 34.1 | 47.6 | 155.3 | 161.8 | 28.5 | 31.2 | 33.3 | 321 |

TABLE 2-continued

DSC/TGA measurements: PLLA N35 + peroxide A–D.

| | $T_g$ (° C.) | | $T_m$ (° C.) | | $\Delta H_m$ (J/g) | | $C_r$ (%) | | |
|---|---|---|---|---|---|---|---|---|---|
| Peroxide | I | II | I | II | I | II | $\Delta H_{100\%}$ = 93.6 J/g | $T_D$ (° C.) | |

I = first heating 200° C. (10° C./min);
II = second heating 200° C. (10° C./min).

EXAMPLE 3

Gel Formation

The possible crosslinking of polylactide was investigated by measuring the gel content of the polymer after the peroxide treatment. Polylactide was blended with different amounts of dibenzoyl peroxide by the method described in Example 1. The gel content was measured according to ASTM D 2765, but chloroform was used instead of xylene. No gel formation was observed if peroxide content was below 0.25 weight-%— and even with peroxide content 3 weight-% the gel formation was low. When the results where further investigated with a particle size analyzer Malvern 2600c, it could be seen that the amount of very small particles was dominating with lower peroxide contents and the amount of large particles was increasing with increasing peroxide amounts. The results are given in Table 3.

TABLE 3

| added peroxide wt-% | gel content % | particle size 1.9–10 μm % | particle size 10–50 μm % | particle size 50–100 μm % | particle size 100–190 μm % |
|---|---|---|---|---|---|
| 0 | 0 | 0 | 0 | 0 | 0 |
| 0.1 | 0 | 0 | 0 | 0 | 0 |
| 0.25 | 0.9 | 86.0 | 13.0 | 0.2 | 0.8 |
| 0.50 | 1.8 | 50.0 | 31.0 | 3.7 | 15.5 |
| 3.00 | 5.1 | 0.2 | 1.3 | 5.1 | 93.4 |

EXAMPLE 4

Melt Properties of Stabilized Polylactides

Poly-L-lactide (PLLA) was stabilized according to the method described in the previous examples which means that the polymer was melt mixed with dibenzoylperoxide (Fluka, half-life 0.742 s) for 5 min at 180° C. The equipment used to measure the melt properties was a Göttfert extruder, screw diameter 30 mm and length 20 D, provided with a melt pump and capillar die, L/D=100/3. The take-off unit was a Göttfert Rheotens tester for uniaxial extension of polymer melts. The polymer melt strand was gripped between two corotating wheels which elongate the strand with constant velocity or constant acceleration until the strand breaks. The constant acceleration was used in this experiment. The tensile force used to elongate the polymer melt was recorded as a function of the speed of the elongated strand.

The temperature profile of the extruder was 160–180–180–180 and the temperature in the melt pump and die was 180° C. The die pressure was adjusted by the melt pump rpm to avoid melt fracture in the polymer strand.

The tensile force of the melt at different speeds is given in Table 4. The stabilized polylactide was compared to unstabilized polylactide and also to a film grade low density polyethylene with melt index 4.5.

TABLE 4

| | Tensile force of the melt, cN | | | | |
|---|---|---|---|---|---|
| speed mm/s | PLLA 0.1% stab | PLLA 0.2% stab | PLLA 0.5% stab | PLLA | LDPE MI 4.5 |
| 60 | 0.7 | 0.7 | 5.3 | 0 | 3.3 |
| 120 | 1.3 | 1.4 | 8.3 | 0 | 8.3 |
| 180 | 2.3 | 2.3 | 10.0 | 0 | 10.7 |
| 300 | 2.7 | 3.3 | 11.0 | * | 12.7 |
| 600 | 3.0 | 4.0 | 12.7 | — | 14.3 |
| at break | — | — | 13.0/660 | — | 15.0/750 |
| 1200 | 3.0 | 4.0 | — | — | — |

*No detectable force was recorded during the measurement and at higher speed the melt stuck to the wheels stopping the rotation From the results it can be seen that polylactide stabilized with 0.5% peroxide is comparable with film grade polyethylene.

EXAMPLE 5

Melt Strength Properties of Stabilized Polylactides

Blown films of different grades of polylactide were produced by a Brabender extruder, screw diameter of which was 19 mm and length 25 D. The extruder was provided with a blow film die of 25 mm in diameter and 1.0 mm die gap. The temperature profile in the extruder was set to 170–180–190° C. and to 190° C. in the die. The screw speed was set at 30 rpm. The blow-up ratio was 2:1. The thickness of the film varied from 10 μm to 150 μm and was adjusted by the speed of the take-off unit.

The extrusion process was followed by a visual inspection of the bubble stability which is the main criteria of proper film blowing and corresponds to the melt strength and elasticity of the polymer extruded. Steady state extrusion was held for one hour.

The film extrusion properties of stabilized and unstabilized polylactides with different molar masses are given in table 5. No blown films could be made from unstabilized polylactide. From the results it can be seen that suitable stabilizer amounts are bigger for polylactides having lower molar masses in order to make proper blown films.

From the examples 4 and 5 it can clearly be seen that the polylactide composition can effectively be tailored for different film applications from thin films to thick ones by changing the molar mass of the polymer and the amount of stabilizer.

TABLE 5

| $M_w$ | stabilizer by weight | Bubble properties |
|---|---|---|
| 145000 (polym A) | none | Bubble collapses due to too low melt strength |
| | 0.1% | Very good bubble stability at thin gauges 10–50 μm |
| | 0.2% | Very good stability at thicker gaugesaround 100 μm |
| 130000 (polym B) | none | Bubble collapses due to too low melt strength |
| | 0.1% | Good bubble stability at thin gauges of 10–50 μm |
| | 0.2% | Very good stability at thin gauges |
| 115000 (polym C) | none | Bubble collapses due to too low melt strength |
| | 0.1% | Bubble unstable, some bubbles break |
| | 0.2% | Bubble unstabile, no breaks |
| | 0.5% | Good stability at thinner gauges of 10–50 μm |

EXAMPLE 6

Physical Properties of Blown Film of Stabilized Polylactide Compared to Unstabilized Polylactide As described above blown film of unstabilized polylactide cannot be made due to lack of melt strength of the polymer. It is however possible to produce blown film of unstabilized blown film by coextrusion. A coextrusion film was made in which the polylactide layer is between two layers of polyethylene, the die temperature setting was 190° C. The used polyethylene was film grade LDPE, NCPE 4024 produced by Borealis Polymers Oy with a melt index of 4,0. The polylactide film was peeled off from the polyethylene layer which is possible because of the relatively low adhesion between polylactide and polyethylene.

Coextrusion films can of course be made also from stabilized polylactides. It might in some special cases be a good method if aseptic film is needed for a special purpose.

The physical properties of the stabilized and unstabilized polylactide films are given in Table 6.

TABLE 6

| sample | stress at peak, MPa | elongation at break, % |
|---|---|---|
| A + 0.1% stab. | MD 41 | MD 290 |
| | TD 34 | TD 220 |
| B + 0.2% stab. | MD 31 | MD 225 |
| | TD 30 | TD 194 |
| A + PE | MD 46 | MD 5 |
| | TD 38 | TD 2 |

Polymer A: $M_w$ = 145000
Polymer B: $M_w$ = 130000
MD = Machine direction
TD = Transverse direction The high flexibility of the films produced from the stabilized polylactide can clearly be seen from the results.

EXAMPLE 7

Addition of Plasticizers to Stabilized Polylactide

The films made from stabilized polylactide are already flexible as such, but can still be further tailored by adding plasticizers to the polymer. A commercial stabilizer was used in the experiments: Emuldan SHR 60, which is a blend of glycerolmonooleate and dioleate (producer Grindsted Products AS, Denmark).

Films were made as described in example 5.

The stress at peak and elongation at break have been given in Table 7. From the results it can be seen that by adding plasticizers the film properties can be further improved and especially the properties in machine direction and transverse direction become more even.

TABLE 7

| sample | stress at peak, MPa | elongation at break, % |
|---|---|---|
| A + 0.1% stab. | MD 41 | MD 290 |
| | TD 34 | TD 220 |
| A + 0.1% stab. + 5% Emuldan | MD 34 | MD 290 |
| | TD 30 | TD 270 |
| B + 0.2% stab. | MD 31 | MD 225 |
| | TD 30 | TD 194 |
| B + 0.2% stab. + 2% Emuldan | MD 41 | MD 260 |
| | TD 39 | TD 250 |

Sample A: $M_w$ = 145000
Sample B: $M_w$ = 130000
MD = Machine direction
TD = Transverse direction

EXAMPLE 8

Addition of Fillers to Polylactide

Different amounts of commercial fillers were added to the stabilized polylactide compositions. Filers and plasticizers can also be used together.

Films were produced according to the procedure described in Example 5. Results are given in Table 8. From the results it can be seen that a small amount of talc gives a very strong and stiff film whereas with greater amounts of kaolin a soft film is obtained which can be further softened by small amounts of some plasticizer.

TABLE 8

| sample | stress at peak, MPa | elongation at break, % |
|---|---|---|
| B + 0.2% stab. | MD 31 | MD 225 |
| | TD 30 | TD 190 |
| B + 0.2% stab + 10% talc | MD 47 | MD 120 |
| | TD 38 | TD 8 |
| B + 0.2% stab. + 30% kaolin | MD 28 | MD 190 |
| B + 0.2% stab. + 2% Emuldan + 30% kaolin | MD 12 | MD 210 |
| | TD 10 | TD 90 |

Sample B: $M_w$ =130000
MD = Machine direction
TD = Transverse direction

EXAMPLE 9

Twist Properties of Stabilized Polylactide Films

When packing of for instance candies in individual wraps they are closed in both ends by twisting about one and half turn. Because one of the best twist materials is cellophane, the comparative test was made using it. The twist properties of the polylactide composition according to the invention were very good.

Twist properties were tested with an equipment developed in-house where the film is covered around the candy surrogate and twisted 1.6 turns in both ends. The machine measures the force needed to open the twist and also the angle which the twist opens by itself. The results for polylactide and cellophane are given in Table 9.

TABLE 9

| sample | return angle, ° | opening force, N |
|---|---|---|
| A + 1% stab. | 55–60 | 5–6.5 |
| cellophane | 130–190 | 4–5 |

EXAMPLE 10

Sealability and Printability of Polylactide Films

The sealing properties of the films made in example 6 were investigated. The sealability of the films was good. Heat sealing was done at 105° C., sealing time was 0.5 seconds. Only one sealing bar was heated during sealing. High frequency sealing was made at 60° C. Seals were complete in both cases.

The printability of the films was tested and films were found to be printable without corona treatment with both solvent and water based inks. The print had very good adhesion to the film as tested by the tape method.

EXAMPLE 11

Degradation of Polylactides Buried in Soil

To show that stabilized polylactides biodegrade at least as well as nonstabilized, test bars with different levels of stabilizers were made by injection molding. The specimens were buried in soil and they were removed at certain time intervals to be tested for mechanical properties. The results have been collected in Table 10 and from them it can be seen that all samples became brittle after 6–8 weeks.

TABLE 10

| sample | time, weeks | tensile modulus MPa | tensile strength MPa | stress at break MPa | elongation at break % |
|---|---|---|---|---|---|
| A | 0 | 3250 | 56.2 | 41.3 | 3.55 |
|   | 2 | 2160 | 44.0 | 27.3 | 18.00 |
|   | 4 | 1850 | 26.3 | 26.3 | 1.53 |
|   | 6 | — | — | — | — |
|   | 8 | 225 | 0.8 | 0.8 | 0.42 |
| A + 0.1% stab | 0 | 2230 | 47.2 | 28.9 | 7.47 |
|   | 2 | 1590 | 32.7 | 18.3 | 47.40 |
|   | 4 | 1949 | 10.7 | 10.6 | 0.50 |
|   | 6 | — | — | — | — |
|   | 8 | 284 | 1.1 | 1.1 | 0.41 |
| A + 0.25% stab | 0 | 2190 | 47.4 | 34.3 | 5.08 |
|   | 2 | 1610 | 28.3 | 28.2 | 2.48 |
|   | 4 | 614 | 3.4 | 3.4 | 0.64 |
|   | 6 | 398 | 1.5 | 1.5 | 0.43 |
|   | 8 | 271 | 0.9 | 0.9 | 0.36 |
| A + 0.5% stab | 0 | 1630 | 39.8 | 13.5 | 219.00 |
|   | 2 | 1550 | 29.6 | 27.5 | 5.83 |
|   | 4 | 1050 | 3.0 | 3.0 | 0.32 |
|   | 6 | 362 | 1.3 | 1.3 | 0.44 |
|   | 8 | 197 | 0.7 | 0.7 | 0.37 |

EXAMPLE 12

Degradation of Stabilized Polylactide Products at Constant Humidity

Test bars according to Example 11 were also stored at constant conditions, temperature 23° C. and humidity 50%. This was done to check the hypothesis that the first stage in biodegradation is hydrolysis by water. The mechanical properties are given in Table 11. Also the molar masses were measured, results are in Table 12. According to the results the hydrolysis rate is higher for the stabilized samples than for nonstabilized. That is probably due to a different crystal structure.

TABLE 11

| sample | time, weeks | stress at yield MPa | tensile strength MPa | stress at break MPa | elongation at break % |
|---|---|---|---|---|---|
| A | 0 | 3250 | 56.2 | 41.3 | 3.55 |
|   | 2 | 2950 | 51.6 | 33.8 | 4.65 |
|   | 4 | 2800 | 50.4 | 31.9 | 5.10 |
|   | 6 | 2220 | 45.4 | 30.9 | 5.73 |
| A + 0.1% stab | 0 | 2230 | 47.2 | 28.9 | 7.47 |
|   | 2 | 1150 | 26.0 | 17.2 | 362 |
|   | 4 | 1210 | 16.3 | 15.6 | 355 |
|   | 6 | 888 | 16.0 | 16.0 | 278 |
| A + 0.25% stab | 0 | 2190 | 47.4 | 34.3 | 5.08 |
|   | 2 | 1260 | 25.3 | 16.6 | 344 |
|   | 4 | 1170 | 17.3 | 15.4 | 335 |
|   | 6 | 910 | 16.9 | 16.8 | 276 |
| A + 0.5% stab | 0 | 1630 | 39.8 | 13.5 | 219 |
|   | 2 | 1280 | 19.0 | 15.3 | 324 |
|   | 4 | 1110 | 14.2 | 14.2 | 316 |
|   | 6 | 745 | 16.2 | 16.1 | 251 |

TABLE 12

|   | time weeks | Polym. A | Polym A + 0.1% stabil. | Polym A + 0.25% stabil. | Polym A + 0.5% stabil. |
|---|---|---|---|---|---|
| $M_w$ g/mol | 0 | 77000 | 117000 | 125000 | 150000 |
|   | 1 | 77000 | 105000 | 104000 | 118000 |
|   | 4 | 75000 | 58000 | 68000 | 75000 |

As can be seen from the above examples, polylactide compositions with good melt strength and the possibility to produce them, enables their use for a great variety og different applications.

What is claimed is:

1. A processable polylactide homopolymer composition, said homopolymer being produced by a process comprising adding, during melt processing of said polylactide homopolymer, an organic peroxide, wherein said organic peroxide is added in an amount of about 0.01–3% by weight of the amount of said homopolymer, wherein said homopolymer polylactide is composed of L-lactide monomers.

2. The processable polylactide homopolymer composition according to claim 1, wherein said organic peroxide is added in an amount of about 0.05–3% by weight of the amount of said homopolymer.

3. The processable polylactide homopolymer composition according to claim 2, wherein said organic peroxide is added in an amount of about 0.05–0.8% by weight of the amount of said homopolymer.

4. The processable polylactide homopolymer composition according to claim 1, wherein said organic peroxide has a half-life of less than 10 seconds at a temperature of 200° C.

5. The processable polylactide homopolymer composition according to claim 2, wherein said organic peroxide is selected from the group consisting of dilauroyl peroxide, tert-butylperoxy-diethylacetate, t-butylperoxy-2- ethylhexanoate, tert-butylperoxyisobutyrate, tert-butylperoxyacetate, tert-butylperoxybenzoate and dibenzoylperoxide.

6. The processable polylactide homopolymer composition according to claim 5, wherein said organic peroxide is tert-butylperoxybenzoate or dibenzoylperoxide.

7. Films or tapes made from the composition according to claim 1.

8. A method for the stabilization of a polylactide homopolymer, comprising:

adding, during melt processing of said polylactide homopolymer, an organic peroxide, wherein said organic peroxide is added in an amount of about 0.01–3% by weight of the amount of said homopolymer, wherein said homopolymer polylactide is composed of L-lactide monomers.

9. The method according to claim 8, wherein said organic peroxide is added in an amount of about 0.05–3% by weight of the amount of said homopolymer.

10. The method according to claim 9, wherein said organic peroxide is added in an amount of about 0.05–0.8% by weight of the amount of said homopolymer.

11. The method according to claim 8, wherein said organic peroxide has a half-life of less than 10 seconds at a temperature of 200° C.

12. The method according to claim 8, wherein said organic peroxide is selected from the group consisting of dilauroyl peroxide, tert-butylperoxy-diethylacetate, t-butylperoxy-2-ethylhexanoate, tert-butylperoxyisobutyrate, tert-butylperoxyacetate, tert-butylperoxybenzoate and dibenzoylperoxide.

13. The method according to claim 12, wherein said organic peroxide is tert-butylperoxybenzoate or dibenzoylperoxide.

* * * * *